(12) United States Patent
Pearson et al.

(10) Patent No.: US 8,979,461 B2
(45) Date of Patent: Mar. 17, 2015

(54) STUD RETAINER ASSEMBLY

(75) Inventors: Timothy D. Pearson, Palos Hills, IL (US); Christopher M. Pangallo, Frankfort, IL (US); James W. Robinson, Mundelein, IL (US); Gordon R. Chetosky, Hinsdale, IL (US)

(73) Assignee: Illinois Tool Works Inc., Glenview, IL (US)

( * ) Notice: Subject to any disclaimer, the term of this patent is extended or adjusted under 35 U.S.C. 154(b) by 314 days.

(21) Appl. No.: 13/258,881

(22) PCT Filed: Feb. 25, 2010

(86) PCT No.: PCT/US2010/025329
§ 371 (c)(1),
(2), (4) Date: Sep. 22, 2011

(87) PCT Pub. No.: WO2010/110985
PCT Pub. Date: Sep. 30, 2010

(65) Prior Publication Data
US 2012/0014767 A1 Jan. 19, 2012

Related U.S. Application Data

(60) Provisional application No. 61/162,531, filed on Mar. 23, 2009.

(51) Int. Cl.
F16B 19/00 (2006.01)
F16B 37/08 (2006.01)
F16L 3/237 (2006.01)

(52) U.S. Cl.
CPC ............. *F16B 37/0842* (2013.01); *F16L 3/237* (2013.01)
USPC ............................................ 411/511; 24/297

(58) Field of Classification Search
USPC ............... 411/511, 512, 918; 24/297; 248/73, 248/74.2
See application file for complete search history.

(56) References Cited

U.S. PATENT DOCUMENTS

| 4,728,236 | A | | 3/1988 | Kraus | |
|---|---|---|---|---|---|
| 4,934,889 | A | * | 6/1990 | Kurosaki | 411/433 |
| 4,999,019 | A | | 3/1991 | Kraus | |
| 5,816,762 | A | * | 10/1998 | Miura et al. | 411/433 |
| 5,941,670 | A | * | 8/1999 | Sano et al. | 411/433 |
| 6,290,201 | B1 | * | 9/2001 | Kanie et al. | 248/636 |
| 6,405,413 | B2 | * | 6/2002 | Ichimaru et al. | 24/297 |
| 6,585,196 | B2 | * | 7/2003 | Nakanishi | 248/68.1 |
| 6,915,990 | B2 | * | 7/2005 | Maruyama | 248/68.1 |
| 7,066,701 | B2 | * | 6/2006 | Kovac | 411/433 |
| 7,267,307 | B2 | * | 9/2007 | Bauer | 248/65 |
| 7,322,784 | B2 | * | 1/2008 | Castro et al. | 411/433 |
| 2006/0099049 | A1 | | 5/2006 | Peterson | |
| 2009/0028668 | A1 | | 1/2009 | Luk | |

FOREIGN PATENT DOCUMENTS

| CN | 1329701 A | 1/2002 |
|---|---|---|
| EP | 0603063 | 7/1997 |
| EP | 0887567 A1 | 12/1998 |

OTHER PUBLICATIONS

ISR for PCT/US2010/025329 dated May 28, 2010.

* cited by examiner

*Primary Examiner* — Gary Estremsky
(74) *Attorney, Agent, or Firm* — Paul F. Donovan

(57) ABSTRACT

A stud retainer assembly includes a housing defining a stud chamber, and at least one stud-retaining arm disposed within the stud chamber. The at least one stud-retaining arm includes a stud engagement member comprising first and second teeth configured to engage a stud. The second tooth is recessed back with respect to the first tooth.

18 Claims, 11 Drawing Sheets

STUD RETAINER ASSEMBLY

RELATED APPLICATIONS

This application is national phase of PCT/US2010/025329 filed Feb. 25, 2010, and claims priority benefits from U.S. Provisional Patent Application No. 61/162,531 entitled "Stud Retainer," filed Mar. 23, 2009.

FIELD OF EMBODIMENTS OF THE INVENTION

Embodiments of the present invention generally relate to a stud retainer assembly, and more particularly to a stud retainer assembly that may be formed of plastic and commonly used in automotive applications.

BACKGROUND

Various components, such as conduits and tubes, may be secured to surfaces, such as walls, ceilings or the like, through fastening assemblies. For example, a cylindrical tube may be secured to a wall through a fastening assembly having a tube channel that snapably secures around a portion of the tube. The fastening assembly itself may be secured to the wall through a stud that is received and retained by a stud retainer, such as shown and described in United States Patent Application Publication No. 2006/0099049, filed Sep. 16, 2005, and United States Patent Application Publication No. 2009/0028668, filed May 7, 2008, both of which are hereby incorporated by reference in their entireties.

Stud retainers have been used with vehicle hoods, cabinet doors, protective covers, and various other applications that are configured for repeated engagement and disengagement between components. In many applications, it is desirable for a fastening assembly to be removed from a structure, such as a vehicle hood. However, in removing the fastening assembly, it is often preferable to maintain the connection between the stud and the stud retainer.

SUMMARY OF EMBODIMENTS OF THE INVENTION

Embodiments of the present invention provide a stud retainer assembly that is configured to allow a stud to be inserted with a relatively low insertion force, while at the same time providing a secure connection between a stud and the retainer assembly when the assembly is removed from another structure.

Certain embodiments of the present invention provide a stud retainer assembly including a housing defining a stud chamber, and at least one stud-retaining arm disposed within the stud chamber. The stud-retaining arm includes a stud engagement member including first and second teeth configured to engage a stud. The second tooth is recessed with respect to the first tooth. That is, the second tooth is further away from a central axis of the stud retainer assembly when the stud-retaining arm is at rest (or at a fully-engaged position with a stud).

The stud-retaining arm may include a hinge integrally formed with the stud-engagement member. The hinge flexibly connects to a portion of the housing.

The housing may include a base integrally connected to parallel beams that are perpendicular to the base. The parallel beams also integrally connect to a wall that is parallel with the base. The stud chamber may be defined between the parallel beams, the base, and the wall.

The stud-engagement member may include a third tooth disposed between the first and second teeth. The second tooth is also recessed with respect to the third tooth. The additional tooth provides a more robust engagement with the stud.

A stop ledge may be separated from the second tooth by a gap. The stud-retaining arm is configured to flex toward the stop ledge through the gap. The stop ledge prevents the stud-retaining aim from flexing past the stop ledge.

The teeth may be angled slightly different from threads of the stud. When the retaining arm is urged toward the stud, the teeth become flush with contact surfaces of the threads.

The stud engagement member may be integrally connected to a portion of the housing through first and second hinges. At least one of the first and second teeth may be below both of the first and second hinges. A pitch between the first and second teeth may be half the pitch between threads of the stud.

Certain embodiments of the present invention provide a stud retainer assembly that includes a housing and a first set of opposing stud-retaining arms. The housing may include a base integrally connected to parallel beams that are perpendicular to the base. The parallel beams also integrally connect to a wall that is parallel with the base. A stud chamber is defined between the parallel beams, the base, and the wall.

The first set of opposing stud-retaining arms is disposed within the stud chamber. Each stud-retaining arm includes a stud engagement member comprising first and second teeth configured to engage a stud. The second tooth is recessed with respect to the first tooth so that the first tooth extends further into stud chamber than the second tooth when the stud-retaining arms are at at-rest positions.

The assembly may also include at least a second set of opposing stud-retaining arms proximate the base.

Certain embodiments of the present invention provide a stud retainer assembly that includes a housing, and at least first, second, third, and fourth stud-retaining arms. The housing may include a base integrally connected to first and second parallel beams that are perpendicular to the base. The first and second parallel beams also integrally connect to a wall that is parallel with the base. A stud chamber is defined between the parallel beams, the base, and the wall.

The first and second stud-retaining arms extend into the stud chamber from the first parallel beam. The third and fourth stud-retaining arms extend into the stud chamber from the second parallel beam. The first and third stud-retaining arms oppose one another, and the second and fourth stud-retaining arms oppose one another.

Each of the stud-retaining arms includes a stud engagement member comprising first, second, and third teeth configured to engage threads of a stud. The third tooth is recessed with respect to the first and second teeth so that the first and second teeth extend further into the stud chamber than the third tooth when the stud-retaining arms are at at-rest positions. Each stud-retaining arm may also include a hinge integrally formed with the stud-engagement member. The hinge flexibly connects to one of the first and second parallel beams.

Figure 1:
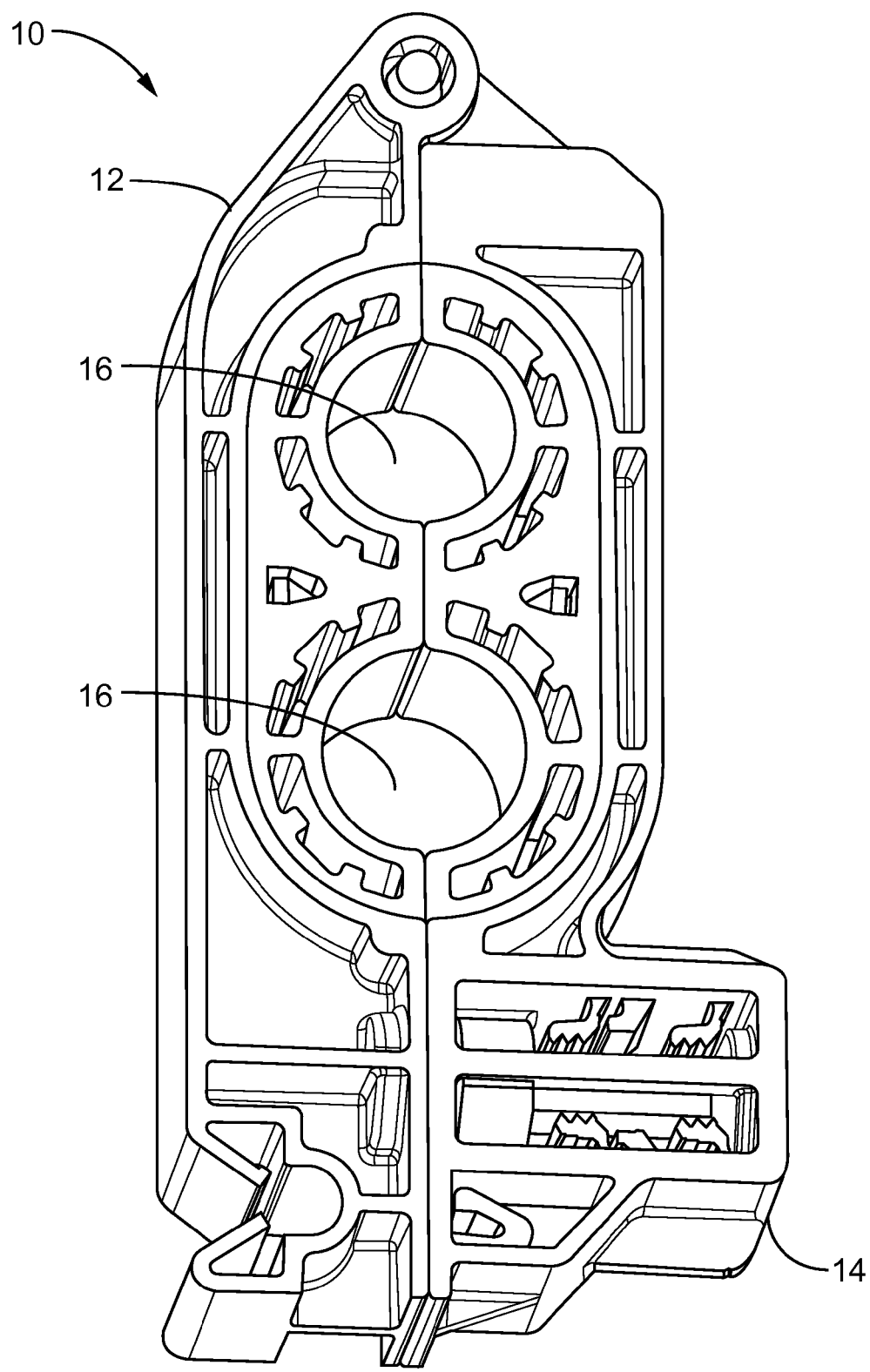
FIG. 1 illustrates an isometric front view of a connector assembly, according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

FIG. 1 illustrates an isometric front view of a connector assembly 10, according to an embodiment of the present invention. The connector assembly 10 includes a main body 12 integrally connected to a stud retainer assembly 14. The main body 12 includes a plurality of tube channels 16, each of which may be sized differently to accommodate different sized tubes (not shown). The tube channels 16 are configured to securely engage around outer circumferential surfaces of tubes. Optionally, instead of tube channels, the connector assembly 10 may include clamps, grooves, latches, clasps, barbs, or the like configured to securely retain various other components, such as rails, beams, or the like. In general, the connector assembly 10 may be configured to secure any component(s) to another structure, such as a vehicle frame. The main body 10 may alternatively be formed and configured similar to those shown and described in United States Patent Application Publication No. 2009/0028668.

The main body 12 is secured to a structure, such as a vehicle frame, hood, or the like, through the stud retainer assembly 14 securely engaging a stud (not shown in FIG. 1). As explained in detail below, the stud retainer assembly 14 is configured to receive a stud through a relatively low insertion force, and retain the stud (that is, prevent the stud from being pulled out) with a retaining force that is greater than the insertion force.

Figure 2:
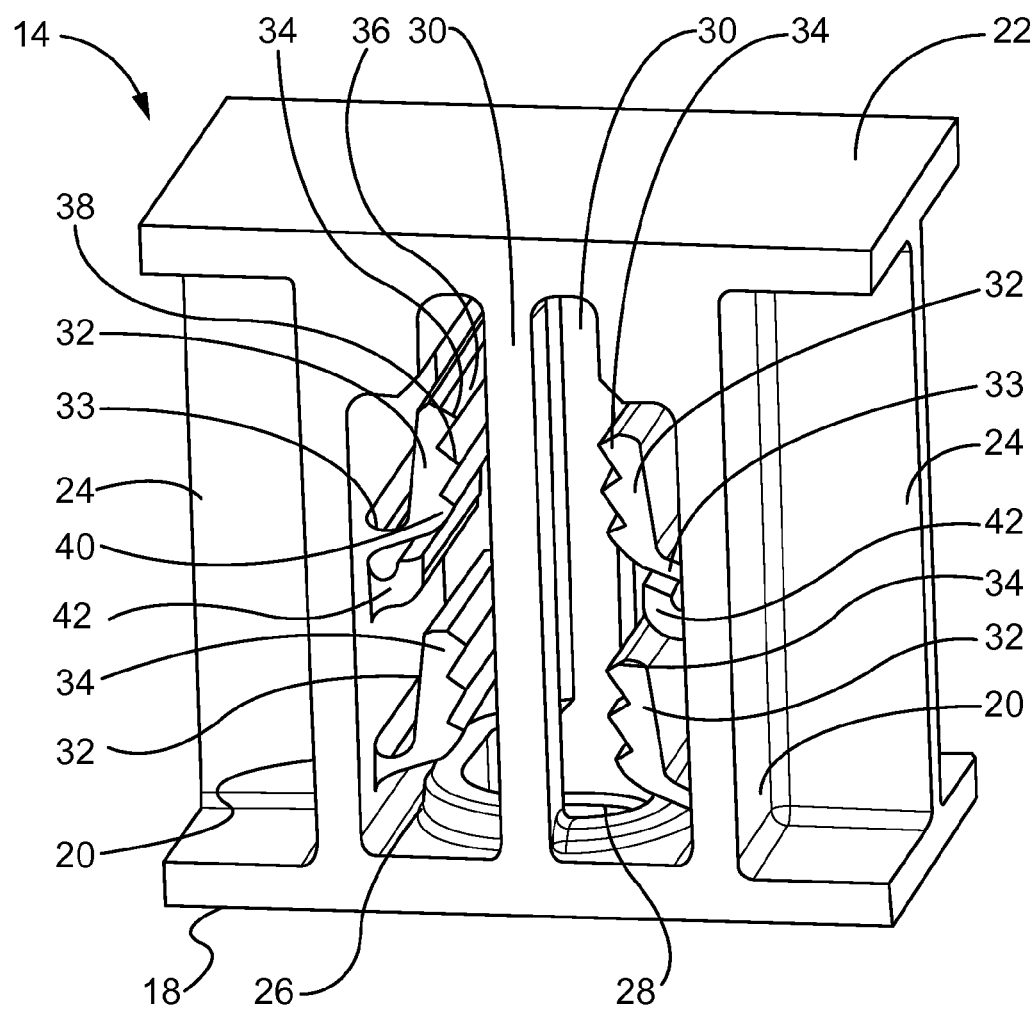
FIG. 2 illustrates an isometric top view of a stud retainer assembly, according to an embodiment of the present invention.
Figure 3:
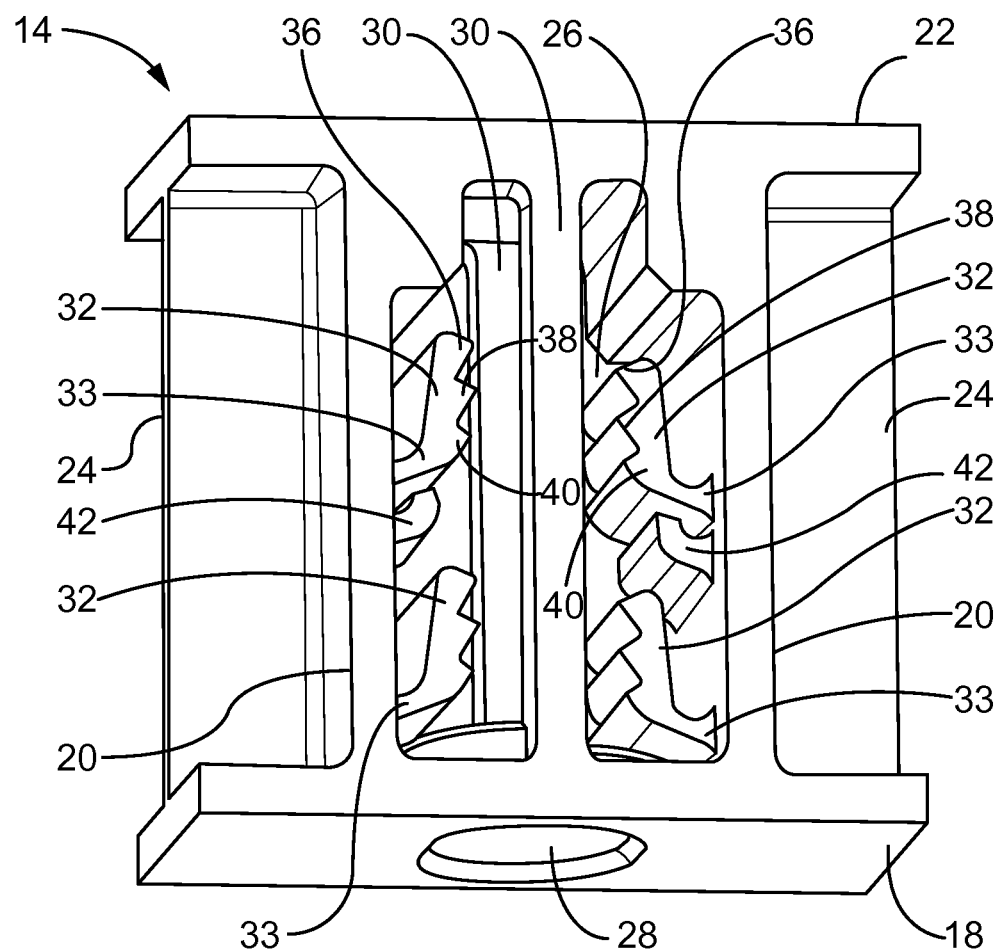
FIG. 3 illustrates an isometric bottom view of a stud retainer assembly, according to an embodiment of the present invention.
Figure 4:
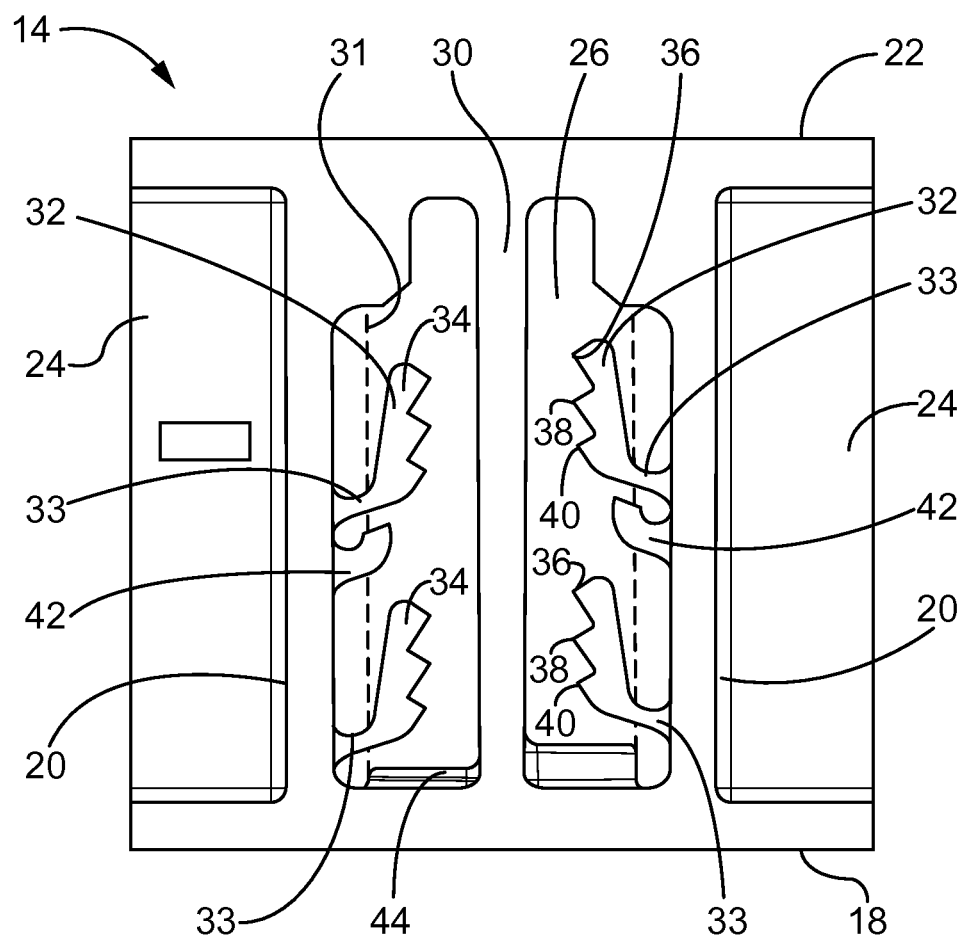
FIG. 4 illustrates a front view of a stud retainer assembly, according to an embodiment of the present invention.

FIGS. 2 and 3 illustrate isometric top and bottom views, respectively, of the stud retainer assembly 14. FIG. 4 illustrates a front view of the stud retainer assembly 14. Referring to FIGS. 2-4, the stud retainer assembly 14 is shown separate and distinct from the connector assembly 10 of FIG. 1 for clarity. However, the stud retainer assembly 14 may be used with any connector that is secured to a structure through a stud.

The stud retainer assembly 14 includes a planar base 18 integrally connected to upstanding beams 20 that are in turn integrally connected to an upper planar wall 22. The wall 22 may integrally connect to a portion of the main body 12 of the connector assembly 10, shown in FIG. 1. Optionally, the wall 22 may be separate and distinct from the main body 12, in which case, the wall 22 and/or other portions of the stud retainer assembly 14 may be securely fastened to the main body 12 through various types of fastening methods.

As shown in FIGS. 2-4, the beams 20 are perpendicular to the base 18 and the wall 22. Bracing struts 24 may also be integrally formed between the base 18 and the wall 22 connecting to outer surfaces of the beams 20 at right angles. As such, the struts 24 may form an I-configuration with the base 18 and the wall 22.

A stud-retaining chamber 26 is defined between the beams 20, the base 18, and the wall 22. A channel 28 is formed through the base 18 that allows a stud to pass into the stud-retaining chamber 26.

Support straps 30 may extend from outer edges of the base 18 mid-way between the beams 20 to outer edges of the wall 22. As shown in FIGS. 2 and 3, in particular, the support straps 30 do not extend into a cylindrical envelope 31 (shown best in FIG. 4) defined by the channel 28. Instead, the straps 30 are located on outer edges of the stud retainer assembly 14 and provide additional bracing support between the base 18 and the wall 22.

Retaining arms 32 extend from interior surfaces of the beams 20 into the chamber 26. Each retaining arm 32 includes a hinge 33 integrally connected to a stud engagement member 34. Each hinge 33 integrally extends from interior surfaces of a beam 20. The hinges 33 are flexible and allow the stud engagement members 34 to pivot about the hinges 33 with respect to the beams 20. The hinges 33 may be at a 20° angle with respect to the plane of the base 18. It has been found that this angle reduces stress on the hinges 33 and allows the retaining arms 32 to upwardly deflect easily and smoothly. Nevertheless, the angle may be adjusted to accommodate varying desired retention forces.

The stud engagement members 34 extend into the cylindrical envelope 31. The stud engagement members 34 are configured to engage outer portions of a stud with the chamber 26, as described infra.

Each stud engagement member 34 has an upper tooth 36, a middle tooth 38, and a lower tooth 40. The upper and middle teeth 36 and 38 extend into the envelope 31 to a greater degree than the lower tooth 40. That is, the lower teeth 40 are recessed toward the beams 20, as compared to the upper and middle teeth 36 and 38. While each stud engagement member 34 is shown having three teeth 34, 36, and 38, more or less teeth may be used. However, each stud engagement member 34 includes an elevated tooth that is above another tooth, which is recessed toward a beam 20 to which it connects through a hinge 33. For example, each stud engagement member 34 may include an upper tooth 36 and the lower tooth 40, but not necessarily the middle tooth 38. However, the addition of the middle tooth 38 provides a stronger and more robust engagement with respect to a stud.

Fixed stop ledges 42 extend from interior surfaces of the beams 20 underneath the upper stud engagement members 34. The stop ledges 42 provide a barrier past which the upper stud engagement members 34 cannot pass. That is, if the hinges 33 flex downwardly toward the stop ledges 42, the upper stud engagement members 34 are stopped from further downward movement.

Similar downward movement of the lower stud engagement members 34 is blocked by the base 18 and/or an upstanding circular collar 44 extending from the base and defining the envelope 31.

As shown in FIG. 4, in particular, opposing retaining arms 32 are offset with respect to one another in order to accommodate a particular threading of a stud. Alternatively, the opposing retaining arms may be aligned in a mirror-image configuration. In general, the opposing retaining arms may be located at the same or different heights, depending on a desired engagement with a particular stud threading.

Figure 5:
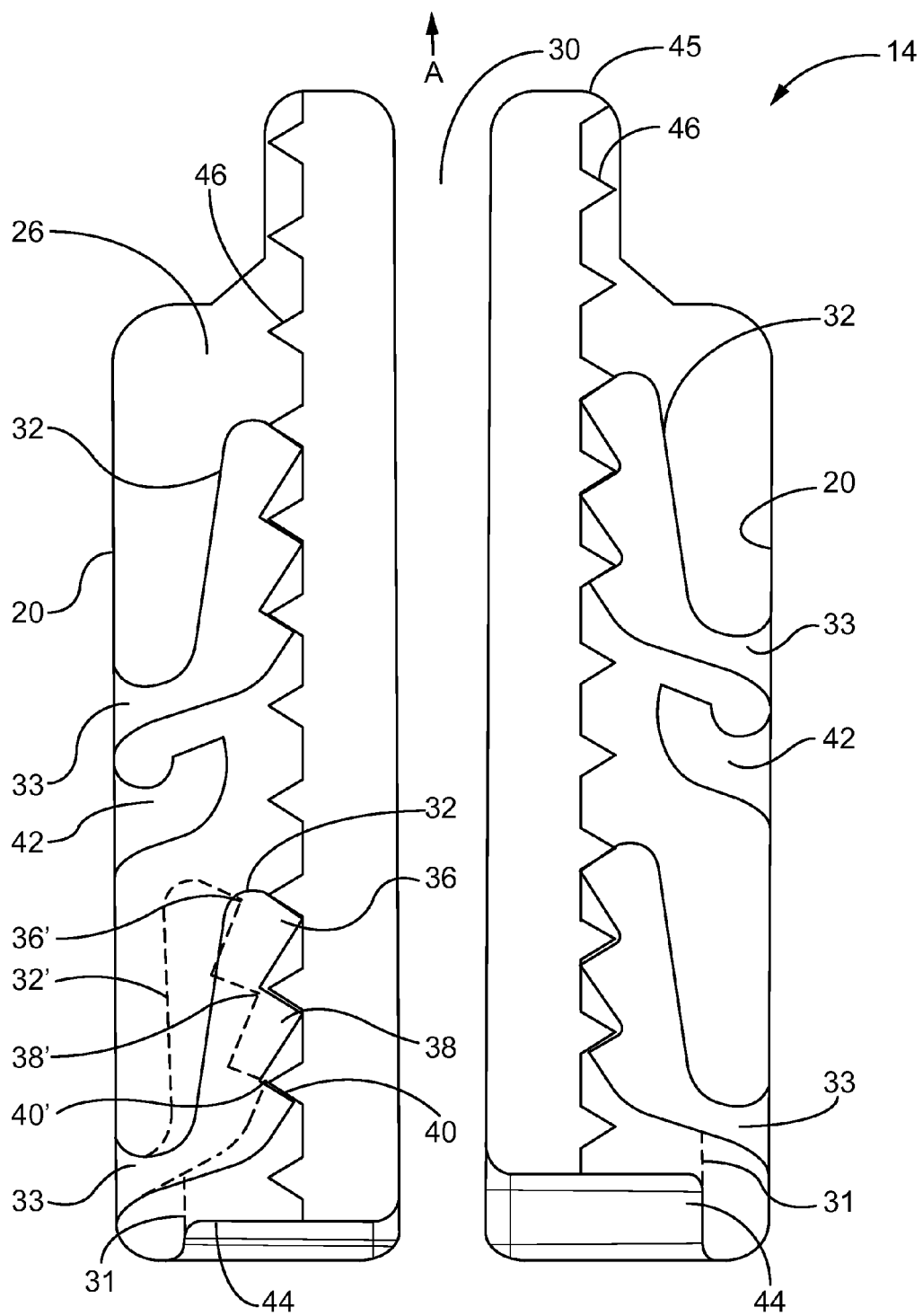
FIG. 5 illustrates a front view of a stud within a stud retainer assembly, according to an embodiment of the present invention.
Figure 6:
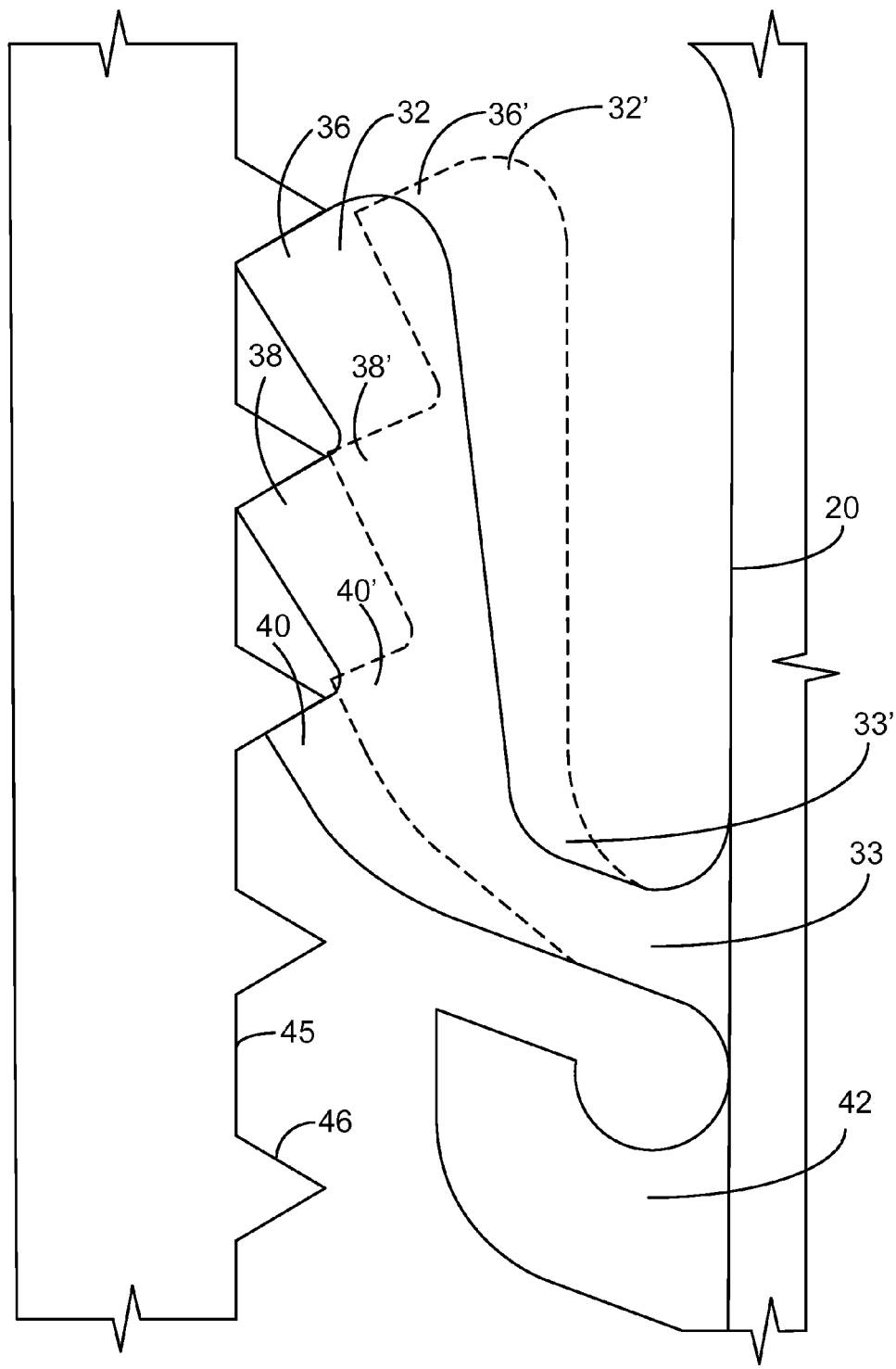
FIG. 6 illustrates a front view of a retaining arm engaging a stud, according to an embodiment of the present invention.

FIG. 5 illustrates a front view of a stud 45 within a stud retainer assembly 14, according to an embodiment of the present invention. FIG. 6 illustrates a front view of a retaining arm 32 engaging a stud 45.

Referring to FIGS. 5 and 6, the stud 45 includes threads 46. In order to insert the stud 45 into the chamber 26, the stud 45 may be threadably urged (or otherwise urged) into the channel 28 (shown in FIG. 3, for example) defined by the collar 44. As the stud 45 is urged into the chamber 26, the threads 46 push into the lower teeth 40. As the stud 45 continues to be urged into the chamber 26, the threads 45 push the lower teeth 40 toward their respective beams 20. The retaining arms 32 flex back toward their respective beams 20, pivoting back about the hinges 33. An example of a flexed back retaining arm is shown in dashed lines as 32' (shown in close-up detail in FIG. 6).

As a thread 46 moves upwardly past a lower tooth 40, the retaining arm 32 snaps back toward the stud 45, as shown by the solid retaining arms 32. However, as the stud 45 continues to be upwardly urged, the threads 46 force the retaining arms 32 to pivot back, as shown, for example, by reference numeral 32'. In this position, the middle tooth 38' and the upper tooth 36' do not contact the stud 45. Because the middle tooth 38' and the upper tooth 36' do not contact the threads 46 in this position, they are less susceptible to damage and remain at full strength for a stud-engaging and retaining position.

Further, the recessed nature of the lower tooth 40 provides less interference with the threads 46, as compared to previous stud retainers. Accordingly, the retainer arm 32' does not flex back as much, which, in turn, leads to less stress on the hinge 33'.

With increased urging of the stud 45 into the chamber 26, when each thread 46 moves past the lower teeth 40, the retaining arms 32 snap back toward the stud 45 such that threads 46 rest on top of each of the teeth 36, 38, and 40.

As shown in FIGS. 5 and 6, when fully-engaged, the threads 46 abut greater portions of the teeth 36 and 38, as compared to the lower tooth 40. This is because the lower tooth 40 is recessed back toward the beam 20. Accordingly, the teeth 36 and 38 are generally below entire lower portions of the threads 46, while the lower tooth 40 is generally below less than an entire portion of the thread 46. For example, the lower tooth 40 may abut about half a lower portion of a particular thread 46 in the fully-engaged position.

Figure 7:
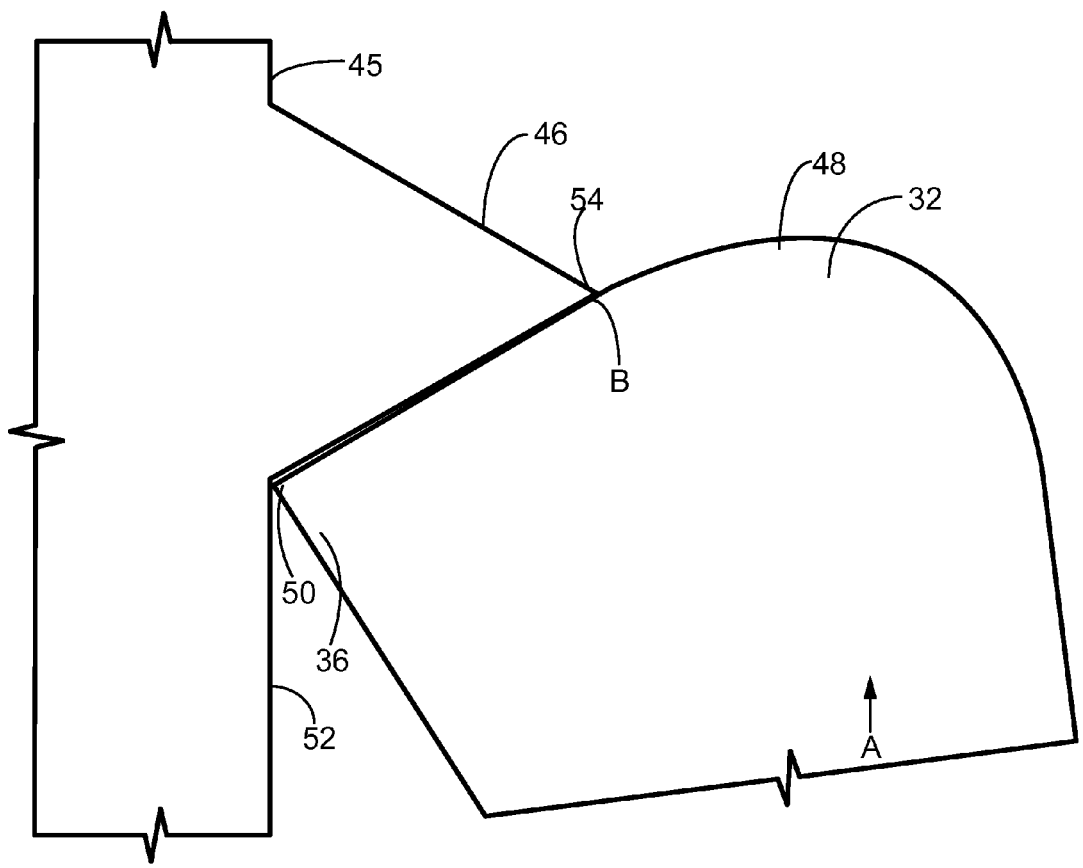
FIG. 7 illustrates a front view of an upper tooth of a retaining arm engaging a thread of a stud, according to an embodiment of the present invention.

FIG. 7 illustrates a front view of an upper tooth 36 of a retaining arm 32 engaging a thread 46 of a stud 45, according to an embodiment of the present invention. FIG. 7 shows the retaining arm 32 in the fully-engaged position in which the thread 46 rests on top of the upper tooth 36. As shown in FIG. 7, the upper tooth 36 integrally connects to a rounded head 48, which prevents the retaining arm 32 from snagging on the threads 46.

As shown in FIG. 7, in the lodged position, a distal point 50 of the tooth 36 is wedged into the shaft 52 of the stud 45 just below the base of the thread 46, resulting in a small gap between the base of the thread 46 and the point 50. Accordingly, a distal tip 54 of the thread 46 is forced into the tooth 36 proximate the rounded head 48 at point B. At point B, the tip 54 is normal to the surface of the tooth 36 proximate the head 48. It has been found that the wedging relationship of the distal point 50 of the tooth 36 forcing the distal tip 54 into a normal orientation with respect to the tooth 36 proximate the head 48 at point B provides maximum retaining strength, as point B generally provides the greatest surface area of material to withstand stress and distributive forces.

The angle between the teeth and the threads differs by a slight amount, such as 1°. The angular difference ensures that during retainer assembly removal from the stud, it forces contact between the stud thread and the tooth to occur at the outer most point of the stud thread (point B). This configuration optimizes force distribution through the threads and the teeth. When the stud is subjected to a removal force, the crest of the stud thread is forced to contact the mating tooth such that as the stud continues to be subjected to the pulling-out force, the entire surface of the tooth engages the stud thread due to the pulling-out force causing the retaining arms 32 to move toward the center of the stud 45. As such, the top side of each tooth abuts flush into the bottom side of a thread as the retaining arms 32 flex toward the stud 45, thereby providing a maximum force that resists removal.

Referring to FIGS. 2-7, the stud 45 is easily inserted into the stud retainer assembly 14 by simply urging the stud 45 into the chamber 26. The retaining arms 32 engage the threads 46 of the stud 45 as explained above. As the threads 46 move into the lower teeth 40 of the stud engagement members 34, the recessed nature of the lower teeth 40 causes the retaining arms 32 to flex back such that the upper and middle teeth 36 and 38 do not contact the threads 46. However, as the threads 46 move past the lower teeth, the retaining arms 32 snap back toward the stud 45 and securely wedge into areas between the teeth, thereby securely retaining the stud within the chamber 26. The stud 45 can continue to be threaded into the chamber 26, thereby repeating the process until the stud 45 is fully inserted.

If the stud 45 is urged in a direction opposite to that of arrow A without a removing threadable rotation, the retainer arms 32 continue to be engaged with the threads 46. That is, each of the teeth 36, 38, and 40 continue to be engaged with the threads 46 at the same time, thereby asserting a relatively large (as compared to the threadable insertion force of the stud into the chamber) resistive force that prevents removal of the stud 45. It has been found that nearly 60% of the load is absorbed by the top tooth 36, 30% of the load is absorbed by the middle tooth 38, and 10% of the load is absorbed by the lower tooth 40. Because of this force distribution among the teeth, the bottom tooth 40 can be backed away from the stud 45 in order to provide less interference for a lower insertion force.

While the retainer arms 32 may flex away from the beams 20, the stop ledges 42, the collar 44 and/or the base 18 stop further movement of the retainer arms 32. That is, the ledges 42 are spaced from the upper retaining aims 32 such that the teeth do not dislodge from secure engagement with the threads 46 when the retainer arm 32 abuts into the ledges 42.

The lower retaining arms 32 are similarly spaced from a stopping component, such as the collar 44 or the base 18.

Thus, in removing the stud retainer assembly 14 from a component, the connection between the stud 45 and the stud retainer assembly 14 is maintained. That is, in order to remove the stud 45 from the stud retainer assembly 14, the stud 45 is rotatably manipulated (as opposed to merely pulling the stud out) in order to threadably release from the stud retainer assembly 14.

Figure 8:
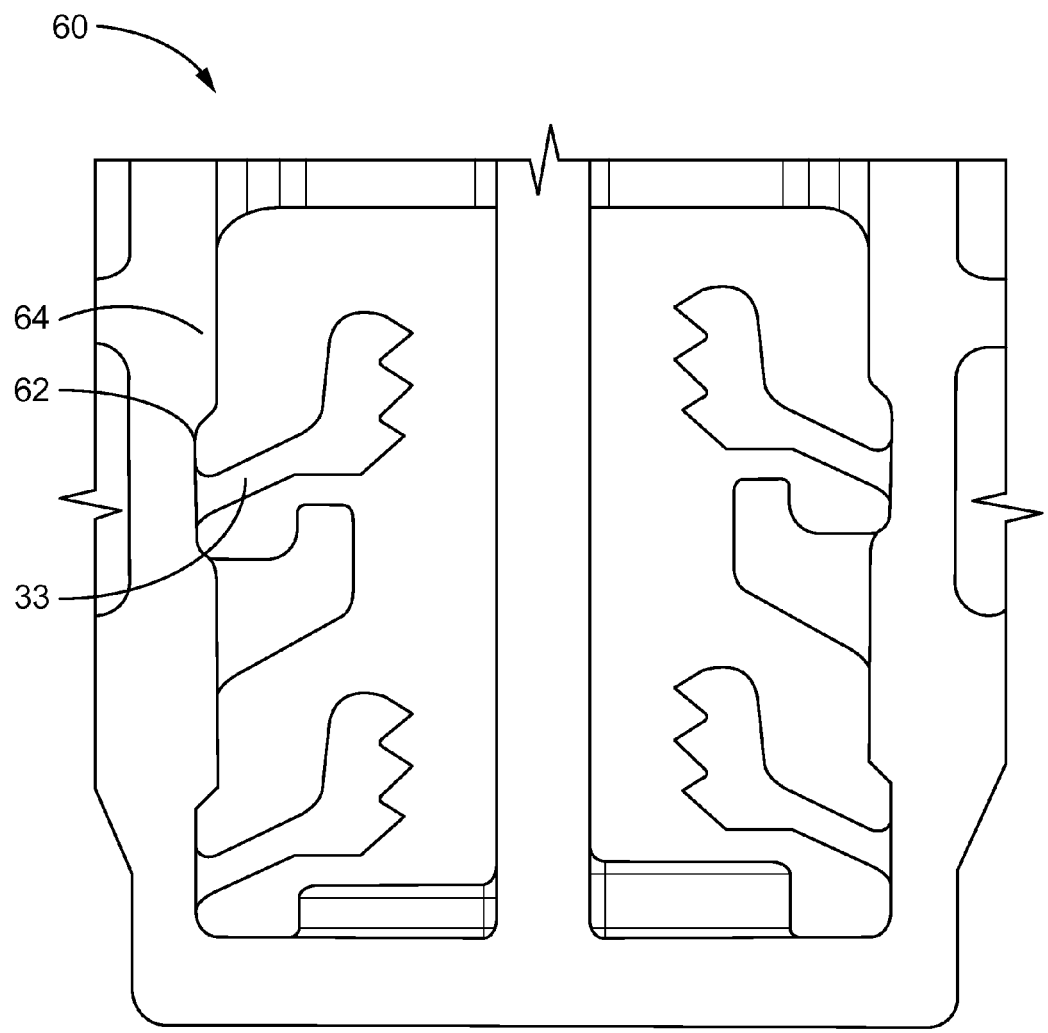
FIG. 8 illustrates a front view of a stud retainer assembly, according to an embodiment of the present invention.

FIG. 8 illustrates a front view of a stud retainer assembly 60, according to an embodiment of the present invention. The assembly 60 is similar to the assembly 14, except that cavities 62 are formed within the beams 64. The hinges 33 connect to the beams 64 within the cavities 62. Accordingly, the hinges 33 are longer and more flexible. In other words, the length of the hinges 33 may be sized depending on a desired amount of flexibility. The cavities 62 allow for longer hinges 33.

Figure 9:
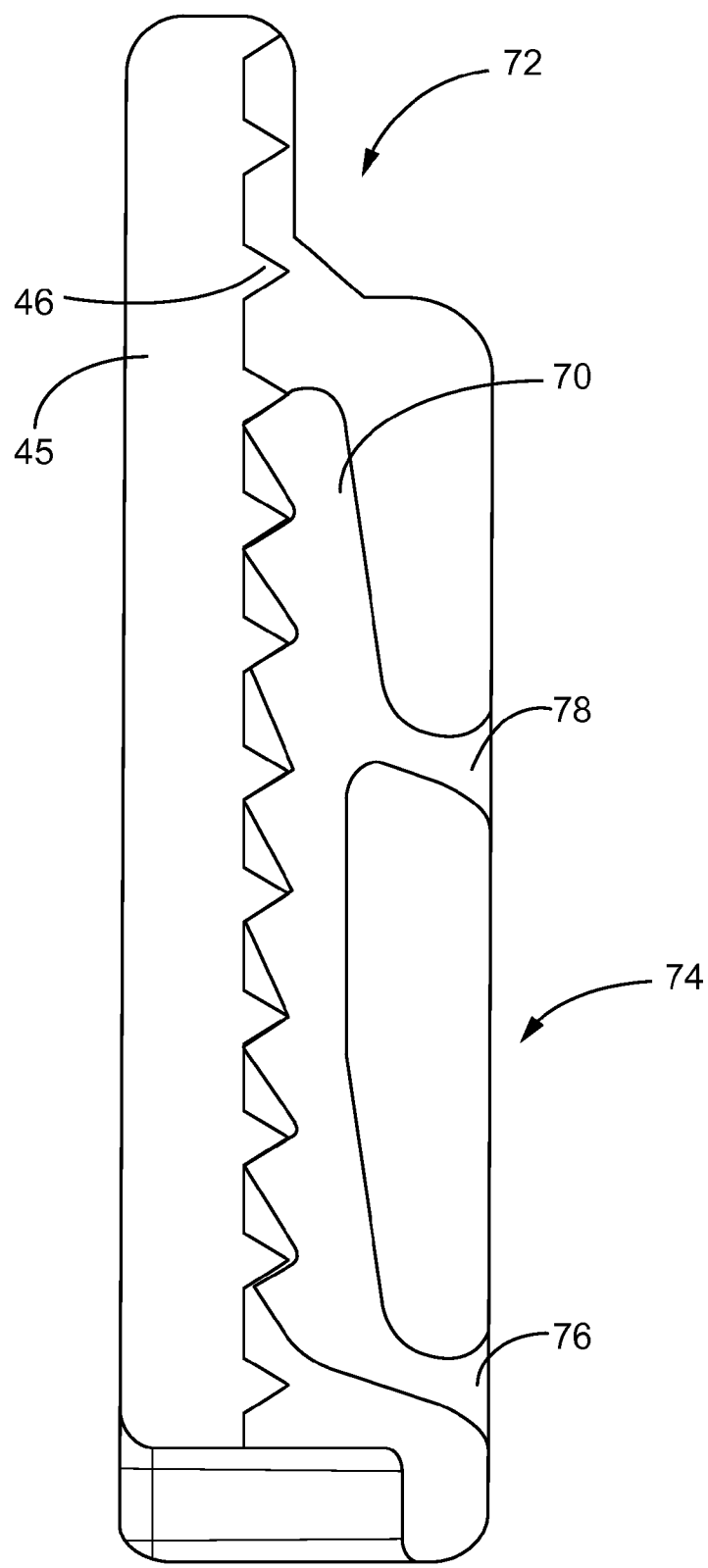
FIG. 9 illustrates a front view of a retaining arm of a stud retainer assembly engaging a stud, according to an embodiment of the present invention.

FIG. 9 illustrates a front view of a retaining arm 70 of a stud retainer assembly 72 engaging a stud 45, according to an embodiment of the present invention. In this embodiment, instead of separate and distinct retaining arms, a single retaining arm 70 is provided. The retaining arm 70 integrally and flexibly connects to the beam 74 through a lower and upper hinge 76 and 78. The lower hinge 76 is below the teeth of the arm 70. The single retaining arm 70 provides more teeth for increased engagement with the threads 46 of the stud 45. The hinges 76 and 78 act in unison to allow the retaining arm 70 to flex, similar to that described above. The single retaining arm 70 having multiple hinges provides a more robust retaining capability.

Figure 10:
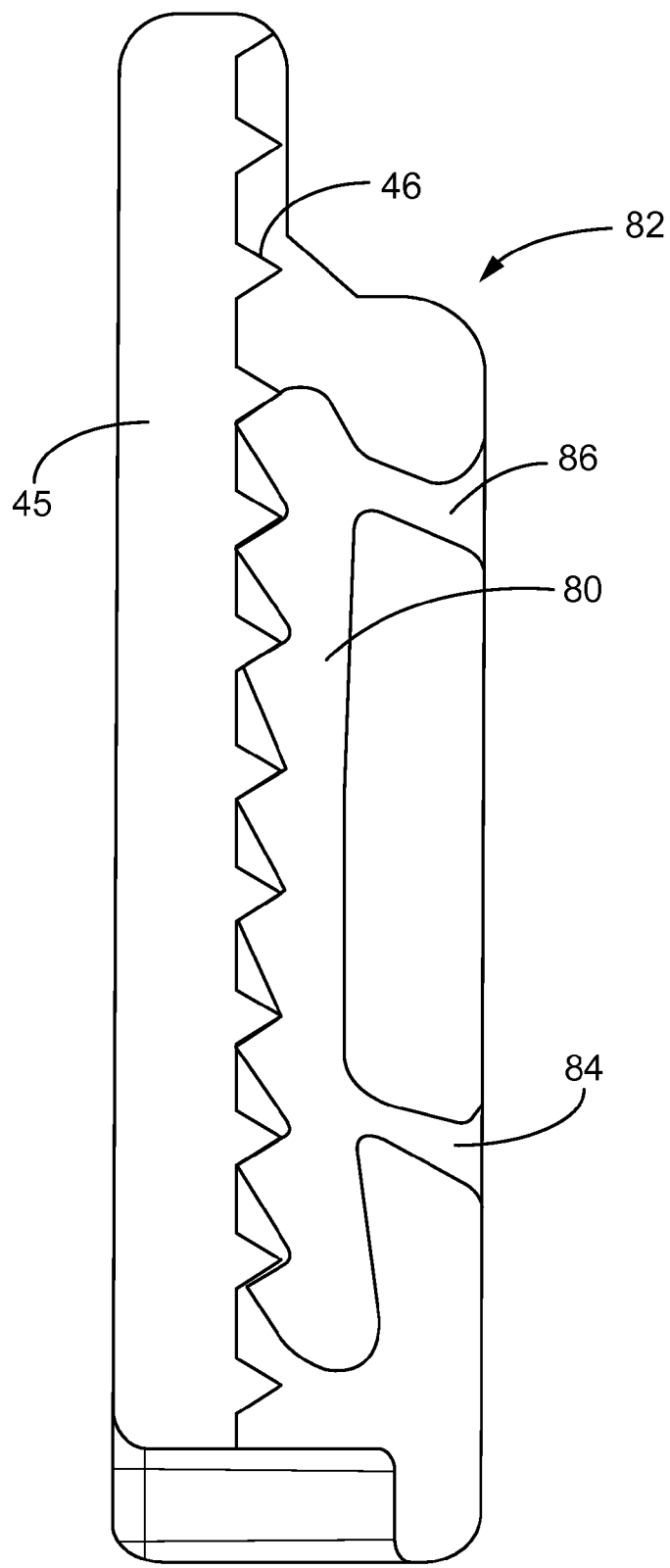
FIG. 10 illustrates a front view of a retaining arm of a stud retainer assembly engaging a stud, according to an embodiment of the present invention.

FIG. 10 illustrates a front view of a retaining arm 80 of a stud retainer assembly 82 engaging a stud 45, according to an embodiment of the present invention. The retaining arm 80 is similar to the retaining arm 70, except that the lower and upper hinges 84 and 86 are shifted up the retaining arm 80. Lower teeth of the retaining arm are below the lower hinge 84. It has been found that this arrangement provides a more flexible retaining arm 80 than that shown in FIG. 9 (with the lower disposition of the hinge 76 shown in FIG. 9 providing a stiffer anchor).

Figure 11:
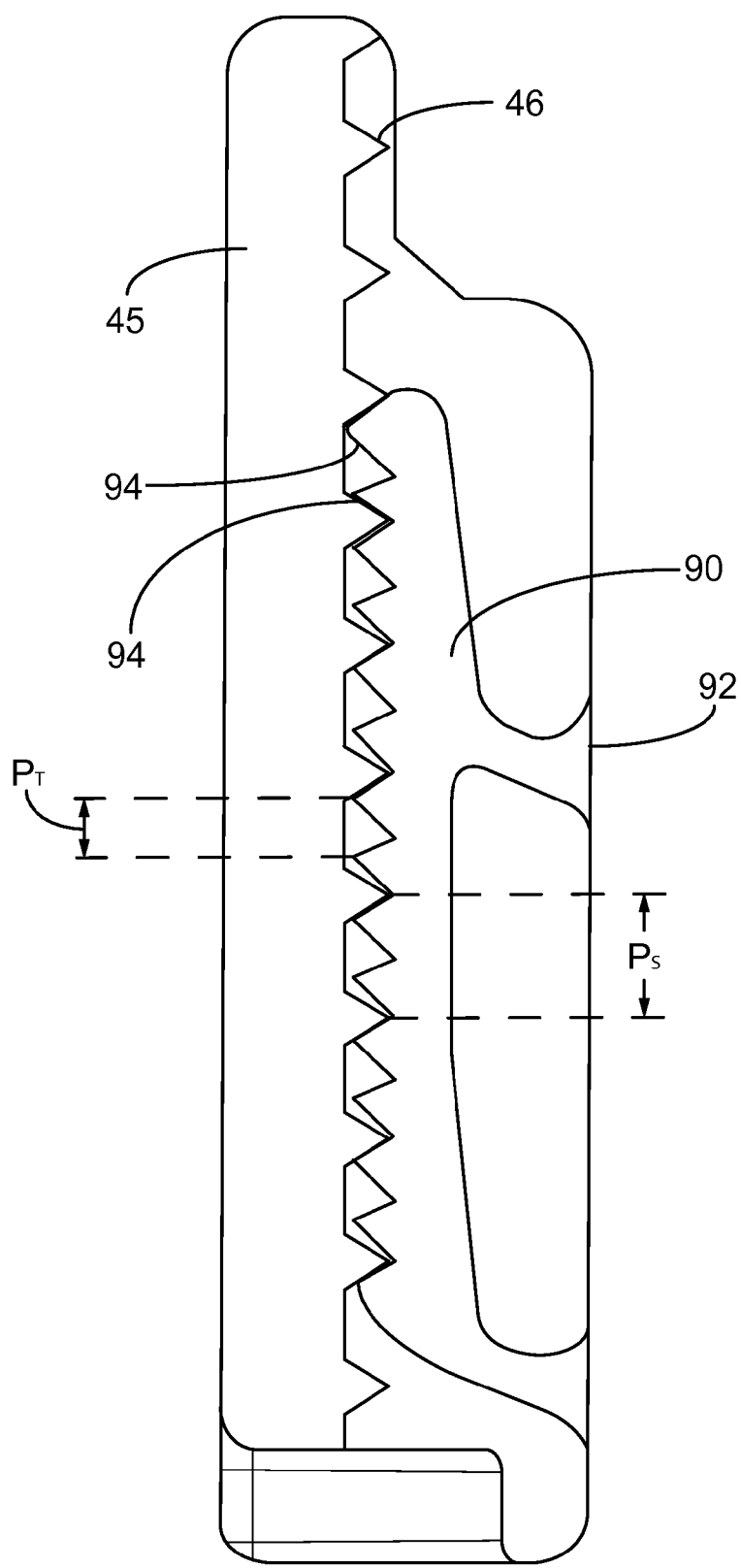
FIG. 11 illustrates a front view of a retaining arm of a stud retainer assembly engaging a stud, according to an embodiment of the present invention.

FIG. 11 illustrates a front view of a retaining arm 90 of a stud retainer assembly 92 engaging a stud 45, according to an embodiment of the present invention. The assembly 92 may be similar to any of the assemblies discussed above, except that the teeth 94 are spaced at half the pitch as those described above. As shown, the teeth 94 are spaced at $P_T$ apart, the threads 46 are spaced at $P_S$ apart, where $P_T$ may be $\frac{1}{2}P_S$. Thus, in a fully-engaged position, one tooth 94 abuts a bottom surface a first thread 46, while an adjacent tooth 94 abuts a top surface of a second thread 46 that is adjacent the first thread 46. Accordingly, the reduced pitch of the teeth may provide a more secure engagement between the retaining arm 90 and the stud 45.

Referring to FIGS. 1-11, embodiments of the present invention provide stud retainer assemblies that are configured to allow a stud to be inserted with a relatively low insertion force, while at the same time providing a secure connection between a stud and the retainer assembly when the assembly is removed from another structure. The assemblies prevent studs from being removed from the assemblies unless an operator specifically desires to remove the studs therefrom through a rotating, threadable movement.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A stud retainer assembly comprising:
a housing having a base connected to beams and defining a stud chamber between said beams; and
at least one stud-retaining arm pivotally connected to a beam so as to extend into said stud chamber, wherein said at least one stud-retaining arm comprises a stud engagement member comprising first, second and third teeth configured to engage a stud, wherein said first tooth is closer to said beam than said second tooth and said second tooth is closer to said beam than said third tooth, and wherein said teeth are further configured such that when the stud is engaged with each tooth said third tooth abuts at least a same amount of the stud as compared to said second tooth and a greater portion of the stud as compared to said first tooth.

2. The assembly of claim 1, wherein said at least one stud-retaining arm comprises a hinge integrally formed with said stud-engagement member, and wherein said hinge flexibly connects to said beam.

3. The assembly of claim 1, wherein said beams are parallel to each other and perpendicular to said base, wherein said parallel beams also integrally connect to a wall that is parallel with said base, and wherein said stud chamber is defined between said parallel beams, said base, and said wall.

4. The assembly of claim 1, further comprising a stop ledge separated from said first tooth by a gap, wherein said at least one stud-retaining arm is configured to flex toward said stop ledge through said gap, and wherein said stop ledge prevents said at least one stud-retaining arm from flexing past said stop ledge.

5. The assembly of claim 1, wherein said teeth are further configured to be angled slightly different from threads of the associated stud, and wherein when said retaining arm is urged toward the stud, said teeth are configured to become flush with contact surfaces of the threads.

6. A stud retainer assembly comprising:
a housing defining a stud chamber; and
at least one stud-retaining arm disposed within said stud chamber, wherein said at least one stud-retaining arm comprises a stud engagement member comprising first and second teeth configured to engage a stud, and wherein said second tooth is recessed with respect to said first tooth, wherein said stud engagement member is integrally connected to a portion of said housing through first and second hinges.

7. The assembly of claim 6, wherein at least one of said first and second teeth is below both of said first and second hinges.

8. The assembly of claim 1, wherein a pitch between said respective teeth is configured to be half the pitch between adjacent threads of the stud.

9. A stud retainer assembly comprising:
a housing comprising a base integrally connected to parallel beams that are perpendicular to said base, wherein said parallel beams also integrally connect to a wall that is parallel with said base, and wherein a stud chamber is defined between said parallel beams, said base, and said wall;
a first set of opposing stud-retaining arms disposed within said stud chamber, wherein each of said first set of opposing stud-retaining arms comprises a stud engagement member comprising first and second teeth configured to engage a stud, and wherein said second tooth is recessed with respect to said first tooth so that said first tooth extends further into stud chamber than said second tooth when said first set of opposing stud-retaining arms are at at-rest positions; and
a stop ledge extending from each of said parallel beams, wherein each stop ledge is separated from one of said second teeth by a gap, wherein each of said stud-retaining arms is configured to flex toward one of said stop ledges through said gap, and wherein each of said stop ledges blocks further movement of each of said stud-retaining arms.

10. The assembly of claim 9, wherein each of said first set of opposing stud-retaining arms comprises a hinge integrally formed with said stud- engagement member, and wherein said hinge flexibly connects to one of said parallel beams.

11. The assembly of claim 9, wherein said opposing stud-retaining arms are offset with respect to one another.

12. The assembly of claim 9, wherein said stud-engagement member comprises a third tooth disposed between said first and second teeth, and wherein said second tooth is recessed with respect to said third tooth.

13. The assembly of claim 9, wherein said teeth are angled slightly different from threads of the stud, and wherein when said retaining arms are urged toward the stud, said teeth become flush with contact surfaces of the threads.

14. The assembly of claim 9, wherein said stud engagement member is integrally connected to one of said parallel beams through first and second hinges.

15. The assembly of claim 14, wherein at least one of said first and second teeth is below both of said first and second hinges.

16. A stud retainer assembly comprising:
a stud;
a housing comprising a base integrally connected to parallel beams that are perpendicular to said base, wherein said parallel beams also integrally connect to a wall that is parallel with said base, and wherein a stud chamber is defined between said parallel beams, said base, and said wall; and
a first set of opposing stud-retaining arms disposed within said stud chamber, wherein each of said first set of opposing stud-retaining arms comprises a stud engagement member comprising first and second teeth configured to engage said stud, and wherein said second tooth is recessed with respect to said first tooth so that said first tooth extends further into stud chamber than said second tooth when said first set of opposing stud-retaining arms are at at-rest positions, wherein a pitch between said first and second teeth is configured to be half the pitch between adjacent threads of said stud.

17. The assembly of claim 9, further comprising a second set of opposing stud-retaining arms proximate said base.

18. A stud retainer assembly comprising:
a housing comprising a base integrally connected to first and second parallel beams that are perpendicular to said base, wherein said first and second parallel beams also integrally connect to a wall that is parallel with said base, and wherein a stud chamber is defined between said parallel beams, said base, and said wall;
first and second stud-retaining arms extending into said stud chamber from said first parallel beam;
third and fourth stud-retaining arms extending into said stud chamber from said second parallel beam, wherein said first and third stud-retaining arms oppose one another, and said second and fourth stud-retaining arms oppose one another,
wherein each of said stud-retaining arms comprises:
a stud engagement member comprising first, second, and third teeth configured to engage threads of a stud, and wherein said third tooth is recessed with respect to said first and second teeth so that said first and second teeth extend further into said stud chamber than said third tooth when said stud-retaining arms are at at-rest positions; and
a hinge integrally formed with said stud-engagement member, and wherein said hinge flexibly connects to one of said first and second parallel beams;
wherein said first and third stud-retaining arms are offset with respect to one another, and wherein said second and fourth stud-retaining arms are offset with respect to one another; and
a first stop ledge extending from said first parallel beam between said first and second stud-retaining arms, and a second stop ledge extending from said second parallel beam between said third and fourth stud-retaining arms.

* * * * *